US010607196B2

(12) United States Patent
Athale et al.

(10) Patent No.: US 10,607,196 B2
(45) Date of Patent: *Mar. 31, 2020

(54) SERVICE REQUEST MESSAGING

(71) Applicant: American Express Travel Related Services Company, Inc., New York, NY (US)

(72) Inventors: Anant Athale, Cave Creek, AZ (US); Srinivas Dasari, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/410,529

(22) Filed: Jan. 19, 2017

(65) Prior Publication Data

US 2017/0132592 A1  May 11, 2017

Related U.S. Application Data

(63) Continuation of application No. 13/621,941, filed on Sep. 18, 2012, now Pat. No. 9,607,344.

(51) Int. Cl.
*G06Q 50/10* (2012.01)
*G06Q 20/10* (2012.01)
*H04L 12/58* (2006.01)
*G06Q 50/00* (2012.01)

(52) U.S. Cl.
CPC ........... *G06Q 20/102* (2013.01); *G06Q 50/10* (2013.01); *H04L 51/20* (2013.01); *H04L 51/32* (2013.01); *G06Q 50/01* (2013.01)

(58) Field of Classification Search
CPC ........ G06Q 30/02; G06Q 50/01; G06Q 20/32; G06Q 20/40
See application file for complete search history.

(56) References Cited

U.S. PATENT DOCUMENTS

| | | | |
|---|---|---|---|
| 10,019,430 B2 * | 7/2018 | Rossi | G06F 17/248 |
| 2009/0210886 A1 * | 8/2009 | Bhojwani | G06Q 20/32 |
| | | | 719/318 |
| 2009/0294523 A1 * | 12/2009 | Marano | G06F 21/31 |
| | | | 235/380 |

(Continued)

OTHER PUBLICATIONS

Thompson, "Social Media From a Technology Point of View", May 2010, CUNA Technology Council. (Year: 2010).*

(Continued)

*Primary Examiner* — Abhishek Vyas
*Assistant Examiner* — Abdulmajeed Aziz
(74) *Attorney, Agent, or Firm* — Thomas | Horstemeyer, LLP

(57) ABSTRACT

A method includes receiving a message comprising a user identification code via a social media messaging channel. In addition, the method includes receiving geo-location information of the device transmitting the message. The method also includes verifying the user identification code by confirming that the geo-location information complies with stored expected geo-location information. The method also includes accessing data associated with a transaction account linked to the user identification code based on the content of the message. The method further includes transmitting a reply to the received message on the social media messaging channel.

19 Claims, 5 Drawing Sheets

(56) References Cited

U.S. PATENT DOCUMENTS

| | | | | |
|---|---|---|---|---|
| 2009/0327134 | A1* | 12/2009 | Carlson | G06Q 20/04 705/44 |
| 2011/0047075 | A1* | 2/2011 | Fourez | G06Q 20/32 705/44 |
| 2011/0066493 | A1* | 3/2011 | Faith | G06Q 20/40 705/14.49 |
| 2011/0106691 | A1* | 5/2011 | Clark | G06Q 40/025 705/38 |
| 2011/0137824 | A1* | 6/2011 | Chung | G06Q 10/06393 705/36 R |
| 2011/0161444 | A1* | 6/2011 | Chauhan | H04L 51/16 709/206 |
| 2012/0029990 | A1* | 2/2012 | Fisher | G06Q 20/105 705/14.19 |
| 2012/0084177 | A1* | 4/2012 | Tanaka | G06Q 30/0613 705/26.41 |
| 2012/0180135 | A1* | 7/2012 | Hodges | G06Q 10/10 726/26 |
| 2012/0226545 | A1* | 9/2012 | Gebb | G06Q 30/02 705/14.27 |
| 2012/0252359 | A1* | 10/2012 | Adams | G06Q 20/3278 455/41.1 |
| 2013/0067208 | A1* | 3/2013 | Brinkman | G06F 9/44505 713/1 |
| 2014/0040129 | A1* | 2/2014 | Akin | G06Q 20/4037 705/44 |
| 2014/0067462 | A1* | 3/2014 | Korosec | G06Q 30/0201 705/7.29 |
| 2014/0164199 | A1* | 6/2014 | Wilkes | G06Q 50/01 705/35 |

OTHER PUBLICATIONS

Tucker, "How to Filter Quickbooks Reports for the Data you Want", Oct. 2011, Quickbooksusers.com. (Year: 2011).*

USPTO; Office Action dated Sep. 11, 2014 in U.S. Appl. No. 13/621,941.

USPTO; Final Office Action dated Feb. 12, 2015 in U.S. Appl. No. 13/621,941.

USPTO; Advisory Action dated Apr. 10, 2015 in U.S. Appl. No. 13/621,941.

USPTO; Office Action dated May 21, 2015 in U.S. Appl. No. 13/621,941.

USPTO; Final Office Action dated Nov. 25, 2015 in U.S. Appl. No. 13/621,941.

USPTO; Advisory Action dated Feb. 10, 2016 in U.S. Appl. No. 13/621,941.

USPTO; Notice of Allowance dated Nov. 22, 2016 in U.S. Appl. No. 13/621,941.

* cited by examiner

SERVICE REQUEST MESSAGING

CROSS-REFERENCE TO RELATED APPLICATIONS

This application is a continuation of, claims priority to and the benefit of, U.S. Ser. No. 13/621,941 filed Sep. 18, 2012 and entitled "METHOD, SYSTEM, AND COMPUTER PROGRAM PRODUCT FOR MERCHANT SERVICING," which is incorporated herein in its entirety by reference.

FIELD OF DISCLOSURE

The present disclosure generally relates to electronic communications. More particularly, the disclosure relates to methods, systems, and computer readable mediums for merchant servicing.

BACKGROUND

Industries, corporates, and/or institutions (herein referred to as "institutions") may have merchants and/or service providers (herein referred to as "merchants") for providing services to the institutions. The institutions and the merchants may agree through a contract to provide bi-lateral services for customers of the institution for a period stated in the contract. For example, financial institutions (e.g., banks) may offer the merchants a contract for servicing customers having transaction accounts in the aforesaid banks. The merchants provide services to customers of the institutions by offering products and/or services in return for considerations from the institution. The customers may perform transactions with the merchants using the transaction accounts, for goods and services. The institutions on behalf of the customers may provide considerations to the merchants via, for example, merchant accounts. The merchant accounts are transaction accounts associated with the merchants. The merchant accounts may be provided to the merchants by the institutions. The institutions may provide services to the merchants in connection with the merchant accounts. The services may be termed as merchant servicing. The merchant servicing may include providing information associated with the customer transactions with the merchants, transactions with the institutions, and/or information relating to the merchant accounts. The institutions may provide services to the merchant by providing monthly account statements, transaction data online on the institution's website and/or information through customer care via helpline telephone numbers. The existing merchant servicing is insufficient to service the merchants.

It would therefore be desirable to provide a method, system and apparatus that enables merchant servicing through social media messaging channels.

SUMMARY OF THE DISCLOSURE

The present disclosure improves upon existing systems and methods by providing a tool for leveraging social media messaging. In various embodiments, the system is configured to receive a message comprising a user identification code via a social media messaging channel. The social media messaging channel may be a secure media messaging channel. For instance, the social media messaging channel may comprise at least one of text message, instant message and computer-supported collaboration work, servicing request message, MIME email message, multimedia messaging service message, and/or short messaging service message.

Additionally, the system is configured to receive geo-location information of the device transmitting the message. In various embodiments, the system may verify user identification code by verifying that the geo-location information matches stored expected geo-location information. The system may be configured to access data associated with a transaction account linked to the user identification code based on the content of the message and transmit a reply to the received message on the social media messaging channel.

In various embodiments, the system may be configured to receive enrollment information for use of the computer-based system, wherein the enrollment information comprises a merchant identifier and a transaction account code. This enrollment information may be merchant log on enrollment information. The transaction account may be a merchant transaction account. Also, in various embodiments, the system may be configured to transmit a second reply to the message on a second social media messaging channel in response to receiving an error message associated with the transmitted reply on the social media messaging channel. The system may be configured to transmit the second reply to the message on a non-social media messaging channel in response to receiving an error message associated with the transmitted reply on the social media messaging channel. In various embodiments, the system may be configured to identify the transaction account based on both the user identification code and the geo-location information used in combination.

In various embodiments, the system may be configured to receive device type information of the device transmitting the message. The system may be configured to identify the transaction account based on one or more of the user identification code, the geo-location information and/or the device type information used in combination. Also, the system may be configured to verify the transaction account based on one or more of the user identification code, the geo-location information and/or the device type information used in combination. The system may poll the social media messaging platform for new messages according to a predetermined periodic schedule.

Also, in various embodiments, the system may be configured to verify the user via the geo-location information. The message may be a query related to at least one of a disputed transaction, a pending settlement, a transaction status, a chargeback, and reconciliation.

The system may be configured to transmit a request for additional information in response to the geo-location information not matching stored expected geo-location information. This (computer-based) system may be administered by, used by, and/or implemented by a transaction processor. The data associated with a transaction account may be related to a specifically identified transaction. Moreover, the reply to the received message may comprise data relating to a selected range of transactions.

BRIEF DESCRIPTION OF THE DRAWINGS

The features and advantages of the present disclosure will become more apparent from the detailed description set forth below when taken in conjunction with the drawings, in which like reference numbers indicate identical or function

DETAILED DESCRIPTION

The present disclosure relates to method, system, and an article of manufacture for merchant servicing. Merchant servicing may include providing information associated with a transaction account of a merchant. The information may include recent transactions, dispute statuses, reconciliation information, net account balance, and the like. In various embodiments, merchant servicing may be enabled using a merchant servicing system (MSS). The MSS may provide merchant servicing through one or more secure social media messaging channels. Social media may include web- and mobile-based technologies which are used to turn communication into interactive dialogue among organizations, communities, and individuals. Social media technologies take on many different forms including magazines, Internet forums, weblogs, social blogs, micro blogging, wikis, social networks, podcasts, photographs or pictures, video, rating and social bookmarking. The MSS may receive a message from a merchant through the one or more social media messaging channels. The MSS, in response to the message, may communicate information associated with the merchant account to the merchant through the one and/or more social media messaging channels, or non-social media messaging channels. The social media messaging channels may include a text message, an instant message and computer-supported collaboration work, a servicing request message, MIME email, and the like. For example, the MSS may service the merchant using messaging channels provided by various social media platforms such as Twitter®, Facebook®, MySpace® and the like. Thus, the MSS may leverage social media messaging channels to provide services to the merchants.

The term "user", "merchant" and "vendor" are used interchangeably herein. A "merchant" is any entity that provides items in return for a consideration. For example, a merchant may be a retail store, a travel agency, a restaurant, a hotel, a service provider, an on-line merchant, and the like. The merchant may be associated with a financial institution through a transaction account (merchant transaction account).

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

Figure 1:
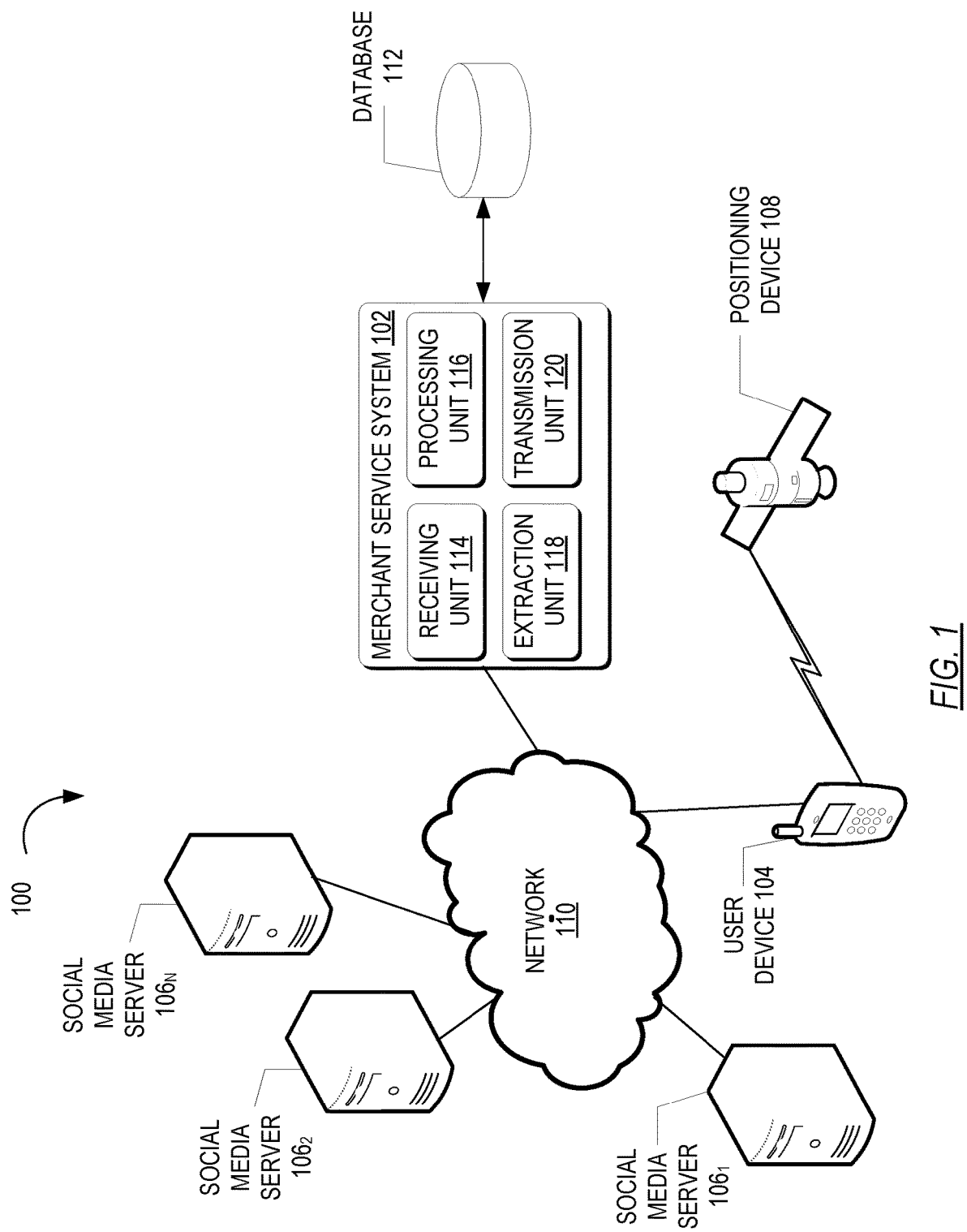
- FIG. 1 is an overview of an exemplary environment in which a merchant service system may be deployed, in accordance with various embodiments.

FIG. 1 shows an exemplary network environment 100, in which various embodiments of the present disclosure may be deployed. As shown in the FIG. 1, exemplary network environment 100 includes a merchant service system (MSS) 102 and a user device 104. Network environment 100 also includes one or more social media servers $106_{1-N}$ and a positioning device 108. MSS 102, user device 104, social media servers $106_{1-N}$, and positioning device 108 may communicate over a network 110.

MSS 102 provides services to a user through one or more social media messaging channels. The services may include providing information such as recent transactions, dispute statuses, reconciliation information, net account balance, transaction updates, and the like, that are associated with a transaction account (merchant account) of the user. In various embodiments, MSS 102 may provide services in response to a message from the user. In various embodiments, MSS 102 may provide services without needing a message from the user. The social media messaging channel may include, for example, a text messaging channel, instant messaging channel and computer-supported collaboration work, a MIME email messaging channel, multimedia messaging service message, short messaging service message and/or any other existing or developed channels. The social media messaging channels are enabled through one or more social media servers $106_{1-N}$. Although the disclosure discusses about MSS 102 providing services through the one or more social media messaging channels, MSS 102 can also provide the services through non-social media messaging channels. MSS 102 may provide the services to the user upon enrollment with MSS 102. In various embodiments, MSS 102 may provide the services without the need for the (or only partial) user enrollment. MSS 102 may be managed by a financial institution (not shown) and/or a third-party (not shown) associated with the financial institution.

MSS 102 may include a receiving unit 114, a processing unit 116, an extraction unit 118, and a transmission unit 120. Receiving unit 114 obtains/receives a new message, such as a message associated with the merchant account communicated by the user to the financial institution through one or more social media servers $106_{1-N}$. In various embodiments, receiving unit 114 polls one or more social media servers $106_{1-N}$ for new messages communicated by the user. In one example implementation, receiving unit 114 may poll one or more social media servers $106_{1-N}$ according to a predetermined schedule. In another example implementation, receiving unit 114 may poll one or more social media servers $106_{1-N}$ non-periodically. Receiving unit 114 may obtain the new message in response to identifying the new message in one or more social media servers $106_{1-N}$. In various embodiments, receiving unit 114 may obtain the message upon listening to availability of new messages in one or more social media servers $106_{1-N}$. In various embodiments, receiving unit 114 may receive the new message communicated by one or more social media servers $106_{1-N}$. Other techniques to receive a new message from one or more social media servers $106_{1-N}$ are contemplated herein. The message received may be an enrollment message or a service request message. The enrollment message may include a request for enrollment, a merchant identifier, and a transaction account code. The enrollment message may also include position information in a hierarchy, user device information, geo-location information, information required for the position if enrolled, and/or the like. The service request message may include transaction account details, user identification codes, request for service associated with the transaction account, device type information, geo-location information associated with the transaction account, among others. Receiving unit 114 may receive geo-location of user device 104 and user device type information from the message itself. In some embodiments, receiving unit 114 may receive geo-location of user device 104 and user device type information from one or more social media servers 106$_{1-N}$. Although, the disclosure discusses receiving the message through one or more social media messaging channels, receiving unit 114 can also receive the message directly from the user through non-social media messaging channels. Receiving unit 114 may communicate the message to processing unit 116.

Processing unit 116 processes the message to determine whether the message is an enrollment message or a service request message. If the message is an enrollment message, processing unit 116 may determine whether the message includes a user identifier and a transaction account code. Processing unit 116 may compare the user identifier and transaction account code with the user identifier information and transaction account code, respectively in database 112. In response to successful comparison, processing unit 116 may enroll the user. Otherwise, processing unit 116 may generate an error message to be communicated to the user. Additionally, processing unit 116 may also process additional data such as hierarchy information, position in hierarchy information, and services required according to the position provided in the message (if any). Processing unit 116 may set hierarchy, positions in the hierarchy and services required for corresponding to the positions, based on hierarchy information, positions in hierarchy, services required for the positions in hierarchy, respectively, obtained from the message.

If the message is a service request message, processing unit 116 may verify the user identification code, the user, the geo-location information of the user, service required and the like. Processing unit 116 may verify the user identification code in the message by confirming that the geo-location information complies with stored expected geo-location information. The expected geo-location information may be stored in database 112. In response to the geo-location information not complying with the stored expected geo-location information, processing unit 116 may generate a request for additional information. The request is communicated to the user through transmission unit 120. In response to the geo-location information complying with the stored expected geo-location information, processing unit 116 may identify that the user information code belongs to the user. Processing unit 116 also verifies and identifies the user via the geo-location information. Processing unit 116 may verify the transaction account of the user based on the user identification code, the geo-location information and/or the device type information. Additionally, processing unit 116 may determine hierarchy information based on the user identification code, if any. Processing unit 116 may determine service requested by user based on service request in message and/or hierarchy information (if any). Processing unit 116 may communicate one or more requests to extraction unit 118 to extract information from database 112, to provide the service. The information may include one or more of transaction data, dispute statuses, reconciliation information, account status, balance in account, and the like.

Extraction unit 118 extracts information associated with transaction account from database 112, based on service request. In some embodiments, extraction unit 118 may extract information relevant to geo-location of the user and/or position of the user in the hierarchy. Consider an example; the user may have two apparel stores, one in Houston and other in New York. If the user communicates a message for transaction information through a user device from Houston location, extraction unit 118, based on geo-location (Houston) may extract transaction information relevant to the user's store in Houston location. For instance, expected geo-location information may be geo-location information in close proximity to a merchant's storefront, for instance, in this case the Houston area.

If the user communicates a message for transaction information through a user device from the New York location, extraction unit 118, based on geo-location (New York) may extract transaction information relevant to the user's store in New York location.

If the user communicates a message for transaction information through a user device from a location other than Houston or New York, extraction unit 118, based on geo-location may request additional information prior to proceeding with information extraction and/or transmission.

In another example, there may be multiple level users for the apparel stores described above. If a level one user requests for transaction data, extraction unit 118 may extract hourly transaction data for the stores. Extraction unit 118 may not extract weekly transaction data for the level one user, as extraction unit 118 is not authorized to provide weekly transaction data to the level one user. The authorization for services may be set by the user in the MSS 102. In yet another example, the level one user of Houston stores may message for the transaction details, extraction unit 118 may extract hourly transaction details associated with Houston store and appropriate for the level one user.

Transmission unit 120 may communicate the extracted information to user device 104 as a reply to the message. Transmission unit 120 may communicate the reply to user device 104 through one or more social media messaging channels, one or more non-social media messaging channels or both. Although, above description describes about MSS 102 processing a single message, it can be appreciated that MSS 102 can process multiple messages as well.

User device 104 as discussed herein may be any device capable of transmitting and receiving messages through one or more social media messaging channels or non-social media messaging channels or both. Examples of user device 104 may include, without limitation, personal computers, Cellular communication devices, Hand-Held display devices, smartphones, personal digital assistants (PDAs), and the like. In various embodiments, user device 104 may include a social media messaging client installed thereon. The user may compose and communicate the message through the social media messaging client. In some example implementations, social media messaging client may be capable of automatically including, for example, the user identification code, transaction account code, geo-location of user device 104, and the like, to the message. In various embodiments, the user may include one or more of the user identification code, transaction account code, request for service, geo-location of user device 104, service request, position in hierarchy information and/or the like. In various embodiments, user device 104 may not include any social media messaging client. In such cases, the user may have to compose the message including the user identification code, the transaction account code, geo-location of user device 104, service request, position in hierarchy information (if any), and the like. User device 104 may include suitable hardware and/or software for communicating with MSS 102 and/or one or more social media servers 106$_{1-N}$ through network 110. In various embodiments, user device 104 may be electrically coupled to a positioning device 108. User device 104 may obtain geometrical co-ordinates of user device 104 through positioning device 108.

Positioning device 108 may be a Global Positioning Satellite (GPS) device for determining geometrical co-ordinates of user device 104. In various embodiments, other technologies, such as global packet radio service (GPRS), Internet Protocol address, may be used to determine geo-location of user device 104.

Social media servers 106$_{1-N}$ may include one or more of a text message server, an instant messaging server, a computer-supported collaboration work server, an email server, a multimedia messaging service message, a short messaging service server, and/or any social networking servers for such as Facebook® and Twitter®. Social media servers 106$_{1-N}$ may host and implement secure social media messaging channels through which the user and MSS 102 communicate with each other.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" (e.g., network 110) includes any cloud, cloud computing system or electronic communications system or method which incorporates hardware and/or software components. It should be appreciated that other types of networks are also contemplated herein. Data communication between user device 104, social media servers 106$_{1-N}$, MSS 102, and positioning device 108 may occur over network 110 through social media messaging channels, in an encrypted or otherwise secure format, in any of a wide variety of known manners. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Database 112 may employ any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, consumer, customer or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate. The data, including the header or trailer may be received by a stand-alone interaction device configured to add, delete, modify, or augment the data in accordance with the header or trailer. The header may be content of a message. Free text entry may be content of a message. As such, in various embodiments, the header or trailer is not stored on the transaction device along with the associated issuer-owned data but instead the appropriate action may be taken by providing to the transaction instrument user at the stand-alone device, the appropriate option for the action to be taken. Database 112 described herein contemplates a data storage arrangement wherein the header or trailer, or header or trailer history, of the data is stored on the transaction instrument in relation to the appropriate data. One skilled in the art will also appreciate that, for security reasons, any databases, systems, devices, servers or other components of database 112 described herein may consist of any combination thereof at a single location or at multiple locations, wherein each database or system includes any of various suitable security features, such as firewalls, access codes, encryption, decryption, compression, decompression, and/or the like.

Database 112 may include pre-stored information related to profile characteristics and financial characteristics of various users. The profile characteristics may include information related to parameters such as merchant identifiers, transaction account codes, stored geo-location information of different merchants, user identification codes of the merchants, and the like. The financial characteristics may include information related to parameters such as transaction records, merchant account hierarchies, account numbers, pending settlement details and the like. Although, database 112 is shown external to MSS 102, database 112 may implemented internal to MSS 102. Further, the profile characteristics and the financial characteristics may also be stored in an internal memory of MSS 102.

Figure 2:
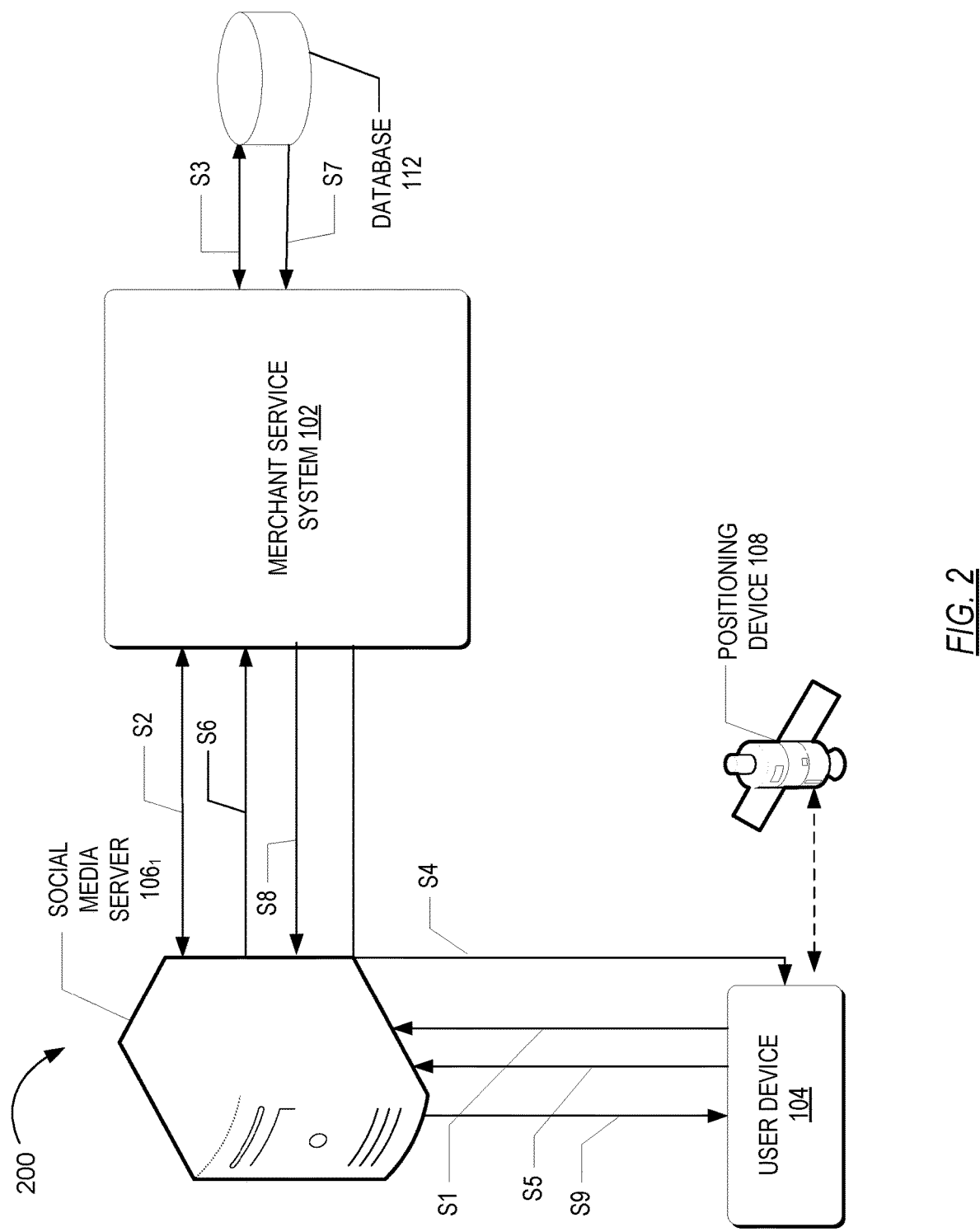
FIG. 2 is a flow chart illustrating communication between a user device and the merchant service system, in accordance with various embodiments.

FIG. 2 illustrates a flow diagram 200 illustrating communication between user device 104 and MSS 102. MSS 102 may communicate with, for example, a social media server $106_1$ for obtaining/receiving a new message addressed to MSS 102. Social media server $106_1$ may receive the message from user device 104 via network 110. The message may be communicated from user device 104 to social media server $106_1$ via a social media messaging channel such as a text messaging channel, an instant messaging channel, an email channel, a computer-supported collaboration work, a servicing request message, a MIME email message, a multimedia messaging service message, a short messaging service message, or the like. In an example, the messages may be sent using a direct messaging service provided by Twitter®. In another example, the messages may be communicated to MSS 102 through short messaging service message. In yet another example, the messages may be sent using an Instant Messaging (IM) service.

According to step S1 of FIG. 2, social medial server $106_1$ may receive a message. The message may be an enrollment message. In an example, the enrollment message may include a user identifier, a transaction account code and request for enrollment. A merchant identifier may be a unique code or serial number identifying the user. The transaction account code may be a code identifying a transaction account of the user. The enrollment message may also include geo-location and device type information of user device 104. The device type information may be an identifier identifying user device 104. Examples of the device information may include, without limitation, mobile number, internet protocol (IP) address, Media Control Access (MAC) address, International Mobile Equipment Identity (IMEI) code, International mobile subscriber identity (ISMI), device ciphering information. The enrollment message may be composed using a social media messaging client installed on user device 104 or without any social media messaging client. In various embodiments, the enrollment message may be composed in a specific format as defined by MSS 102. For example, the enrollment message may be composed in a following format:

$$\#enrol\ merc\ ID\ nnnn\ dev\ ID \qquad (1)$$

The enrollment message may comprise of a header for identifying a type of message. As seen in (1), the header is #enrol. Thus, it may be implied that the type of message is an enrollment message. Further, the enrollment message may include a user (merchant) identifier ("merc ID"), a transaction account code ("nnnn") and a device ID ("dev ID"). In various embodiments, the message can be composed without any format and MSS 102 may process the message.

In step S2, MSS 102 may obtain/receive the new message from social media servers $106_1$. MSS 102 may also obtain a current geo-location of user device 104. In various embodiments, MSS 102 may obtain the geo-location information of user device 104 from social media server $106_1$. In various embodiments, MSS 102 may obtain geo-location information of user device 104 directly from the message or user device 104. In various embodiments, MSS 102 may receive geo-location from positioning device 108 communicatively coupled to user device 104. MSS 102 may compare the obtained geo-location with geo-location of user device 104 as stored in database 112 to determine whether the geo-location of user device 104 matches the geo-location stored in database 112. In response to successful comparison, MSS 102 may authenticate the user identification code, and the user using the geo-location information.

In step S3, MSS 102 may verify the transaction account code, based on the verification details obtained from database 112. The verification details may comprise of merchant characteristic data such as transaction account information, a merchant identifier, and geo-locations of merchant centers, pre-stored in database 112. In response to successful comparison, MSS 102 may authenticate the transaction account code. Furthermore, if message includes additional information such as organizational details, hierarchy information, position of the user in hierarchy and information required for the position, MSS 102 may set hierarchy for user organization, position of the user in the hierarchy, and default information to be communicated to user in case of message from the user without specific request. MSS 102 may communicate a successful enrollment notification as a reply to the enrollment message to user device 104 through social media server 106₁ as depicted in step S4. If the authentication of the user identification code and/or the transaction account code fails, MSS 102 may communicate an error notification to user device 104. In addition, MSS 102 may ask for additional details from the user.

In step S5, social media server 106₁ may receive a new message from user device 104 addressed to MSS 102. The message may be received through a social media messaging channel, such as a text messaging channel, MIME e-mail channel, and instant messaging channel, and the like. The message may be a service request message. In step S6, MSS 102 may obtain the message addressed to MSS 102 through, for example, polling. The message may include user identification code, transaction account information, a service request for information associated with the transaction account, device type information (optional), geo-location information (optional) and position in hierarchy information (if any). The information associated with the transaction account may include recent payments, dispute statuses, pending settlements, reconciliation information, and/or the like. In various embodiments, the service request message may be in a fixed format. For example, the message format for the service request message may be as follows:

MYPAY nnnn mm/dd/yyyy mm/dd/yyyy UID   (2)

According to (2), the header of the transaction query message is "MYPAY", standing for "My Payment". A listing of headers and the results they obtain may be communicated to the user at any time, for instance, in response to an incorrect or unknown header being received. The transaction query may further include the last four digits ("nnnn") of the transaction account of the user, the two dates between which the transaction details are required, and the user identification code of the user. The date format, as depicted in (2), is an "mm/dd/yyyy" format, however other date formats may also be used. In various embodiments, the message may be in a format free text that may be processed by MSS 102.

MSS 102 may process the message to verify the user identification code of the user. MSS 102 may verify the user identification code by confirming that the geo-location information complies with stored expected geo-location information. The geo-location information of user device 104 may be obtained as previously described. If the user identification code authentication fails, MSS 102 may transmit an error message such as "incorrect user identification code" notification back to user device 104. Otherwise, MSS 102 may verify the transaction account of the user based on user identification code, the geo-location information, and/or device type information. In response to successful verification, MSS 102 may identify the service request in the message. Based on the service request, MSS 102, in step S7, may extract information associated with the transaction account from database 112. For example, if a user requests for transaction details between particular dates through the message, MSS 102 may extract the transaction details such as amount of deposits, date of deposits and locations of deposits of those dates from database 112. Additionally, if the message includes hierarchy information, MSS 102 may evaluate whether there is an authorization to provide service requested. If MSS 102 determines that there is authorization to provide service requested for the position in hierarchy, MSS 102 may extract information based on the service requested in accordance to the position of the user in hierarchy. Otherwise, MSS 102 may generate an error message.

In various embodiments, an account hierarchy may also be stored within database 112. The account hierarchy may depict relationship between multiple transaction accounts held by a single user. MSS 102 may extract transaction details from database 112 based on the account hierarchy. For example, if a transaction query message includes a transaction query for retrieving payment details related to a parent account held by a merchant, MSS 102 may also extract payment details related to all other accounts that have a hierarchical relationship with the parent account.

In step S8, MSS 102 may provide the service requested through social media server 106₁. Referring to the above stated example of a user sending a transaction query message for retrieving information related to payments, MSS 102 may provide the transaction details in a following format for dates between Oct. 10, 2010 and Oct. 13, 2010:

TABLE 1

| Transaction Details | | | |
| --- | --- | --- | --- |
| Transaction Date | Amount of Transaction | Type of Transaction | Location of Transaction |
| Oct. 10, 2010 | $433.54 | Credit | Austin, Texas City |
| Oct. 10, 2010 | $200.00 | Credit | Houston |
| Oct. 13, 2010 | $120.50 | Negotiable instrument | Manhattan |

In the above table, transactions for the dates are provided for illustration purposes only.

In step S8, MSS 102 may communicate the information as a reply to the message via social media server 106₁ through the social media messaging channel. For example, if the user communicates the message to MSS 102 using a messaging service provided by Twitter®, MSS 102 may communicate the reply in response to message using the same messaging service (Twitter®). Social media server 106₁ may receive the reply. In step S9, social media server 106₁ may transmit the reply to the user. The user may receive the reply in user device 104.

In various embodiments, MSS 102 may communicate the reply through one or more social media messaging channels other than the social media messaging channel used by the user. MSS 102 may communicate the reply through another social media messaging channel responsive to a receiving error message while communicating the reply through the social media messaging channel used by the user. The error message may be received due to a failure in communication of the reply due to various technical errors such as network congestion, server downtime, channel maintenance, and the like. In various embodiments, MSS 102 may communicate the reply to the user using a non-social media messaging channel such as through direct e-mail. Alternate channels for information communications and the hierarchy/preferred order of their use may be predefined by the user.

In various embodiments, in response to receiving a communication from a validated user, such as a prior user, MSS 102 may communicate reply comprising the type of prior requested information. In this way, a repeat user does not have to include the full request message including header information to MSS 102 in subsequent communications.

Although, FIG. 2 illustrates a step of enrollment before communicating the message for service, one can appreciate that MSS 102 can also provide services to messages without a requirement of the user enrolling with MSS 102 as database 112 may include user information that can be used to verify the credentials of the user through social media messaging channels.

Figure 3:
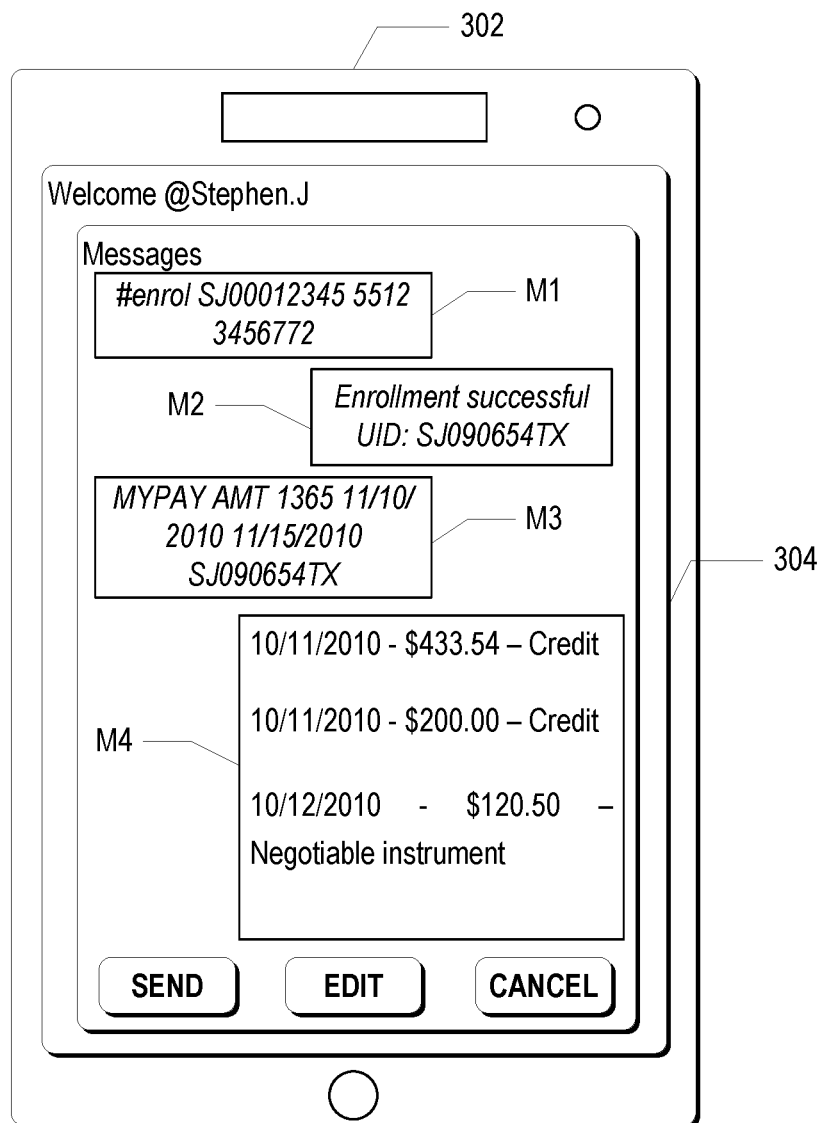
FIG. 3 is a user interface view illustrating merchant servicing through a social media messaging channel, in accordance with various embodiments.

FIG. 3 is a user interface view illustrating merchant servicing through social media messaging channel. A user may have an account registered with a social media messaging channel provider. As illustrated in FIG. 3, the user (Stephen Johns) has a registered social media messaging username "@Stephen.J" with a social media messaging channel provider. The user may login to the registered account using the registered social messaging username through a user device 302. The user may compose an enrollment message M1 addressed to MSS (not shown) using a messaging interface of the social media messaging channel. As illustrated in FIG. 3, the user may compose the message in the format "#enrol SJ00012345 55123456772". The header #enrol indicates request for enrollment. The portion "SJ00012345" indicates a merchant identifier. The portion "55123456772" indicates a transaction account code. The user may communicate the enrollment message to the MSS through a social media messaging channel (using send button).

In response to receiving the enrollment message M1 and successful enrollment, MSS may communicate a reply M2 to user device 302. The reply M2 as illustrated indicates a "successful enrollment" notification. In the current example, the reply M2 includes the user identification code of the user. As depicted in FIG. 3, the successful enrollment message may be displayed as "Enrollment successful UID: SJ090654TX". The UID may be the user identification code of the user to be used for further communications with the MSS.

Once the reply M2, i.e. "successful enrollment" notification, is received by the user, the user may compose the transaction query message on the messaging interface 304. The transaction query message M3 may be composed by the user in a pre-defined message format. As depicted in an example in FIG. 3, the user may compose a service request message M3 as: "MYPAY AMT 1365 11/10/2010 11/15/2010 SJ090654TX". Referring to the format of transaction query message M3, the message body may include a header identifying type of transaction parameter queried about. As illustrated, the header "MYPAY AMT" may indicate that the service request is associated with "amount of payments deposited". The message body may further include the last four digits of the user's transaction account number (1365) and the dates between which the user has requested details of transactions associated with the user's transaction account. The dates are followed by the user identification code (SJ090654TX). Once the transaction query message is composed in a pre-defined format, the user communicates service request message M3.

In response to receiving service request message M3, the MSS may perform validations on the service request message M3. In response to validation of the service request message M3, MSS 102 may communicate transaction information associated amount of payments deposited in the user transaction account between Oct. 11, 2010 and Oct. 12, 2010. The transaction information may be communicated in a form of message M4. As depicted, the transaction detail message M4 may be displayed as a response to the transaction query message M3. As depicted, amounts $433.54 and $200 have been credited to the user's transaction account on 11 Oct. 2010. Further, an amount of $120.50 has been deposited to user's transaction account on 12 Oct. 2010 through a negotiable instrument.

Figure 4:
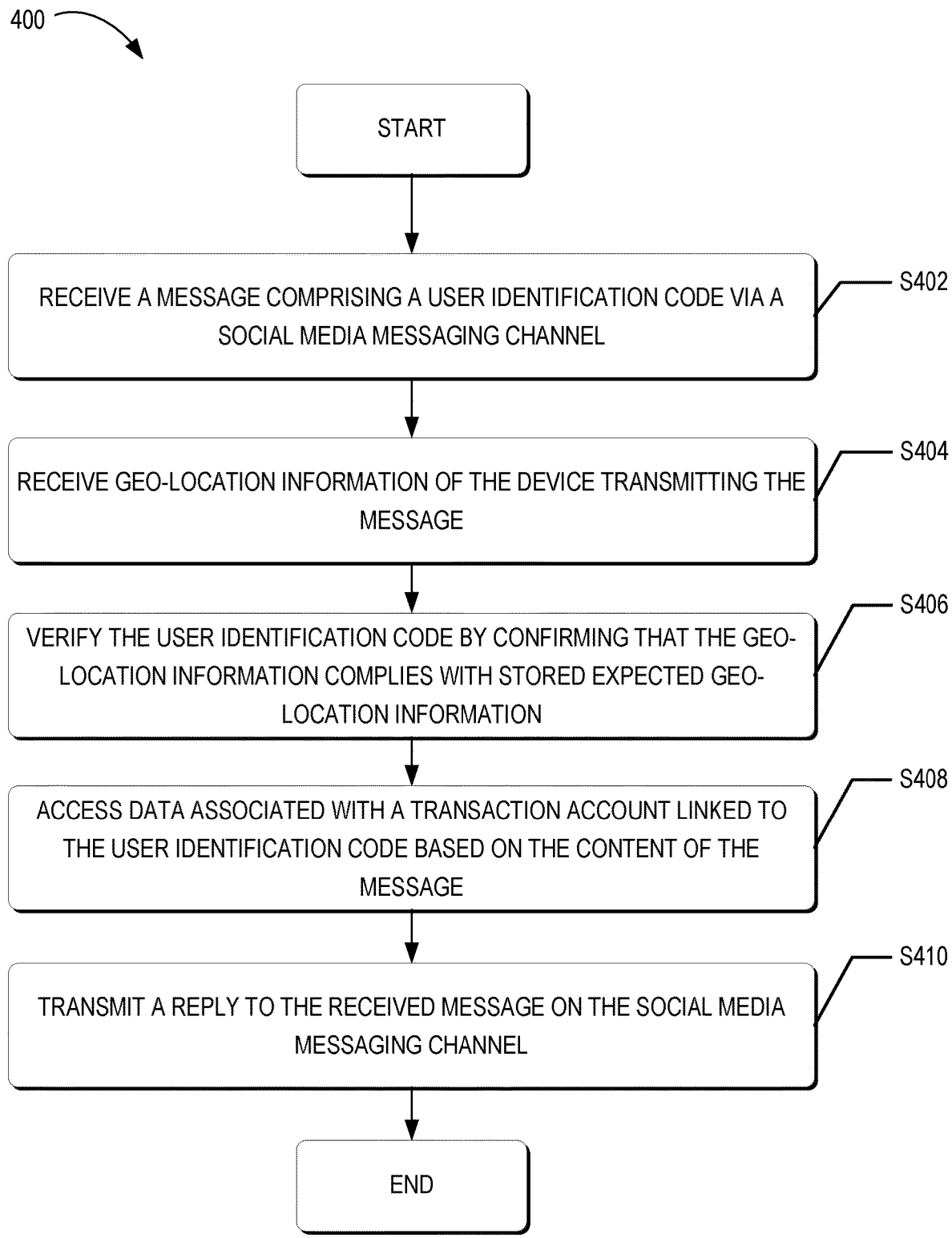
FIG. 4 is a process flow illustrating merchant servicing, in accordance with various embodiments.

FIG. 4 illustrates a process flow 400 for merchant servicing. The process may begin at step S402 where MSS 102 receives a message comprising a user identification code via a social media messaging channel. The social media messaging channel may comprise text message, instant message and computer-supported collaboration work, MIME e-mail message, multimedia messaging service, short messaging service, and the like. The social media messaging channel may be enabled by one or more social media servers $106_{1-N}$. In one example, MSS 102 may receive the message through one or more social media servers $106_{1-N}$.

At step S404, MSS 102 receives geo-location information of user device 104. In various embodiments, MSS 102 may receive the geo-location information of user device 104 from the message or user device 104. In various embodiments, MSS 102 may receive geo-location information of user device 104 from one or more social media servers $106_{1-N}$. At step S406, MSS 102 verifies the user identification code of the user obtained from user device 104. MSS 102 may verify the user identification code by confirming that the geo-location information obtained complies with the geo-location information stored in database 112.

At step S408, MSS 102 accesses data associated with the transaction account linked with the user identification code based on the content of the message. The data associated with the transaction account of the user may be stored in database 112. The data associated with the transaction account of the user may include transaction details such as details associated with a disputed transaction, a pending settlement, a transaction status, a chargeback, and reconciliation, and/or the like. The data associated with the transaction account of the user may be accessed from database 112. The data associated with the transaction account of the user may be accessed based on the content of the message. For example, if the message content is for retrieving last five payments then data related to the last five payments such as amount of payment, mode of payment, date of payment, location of payment, and the like, may be extracted from database 112. At step S410, MSS 102 transmits a reply to the received message on the social media messaging channel. The reply may be transmitted to user device 104 through one or more social media server $106_{1-N}$. The reply may include the data related to the last five payments associated with the transaction account.

The present disclosure (i.e., system 100, system 200, process 400, system 400, process 500, or any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

Figure 5:
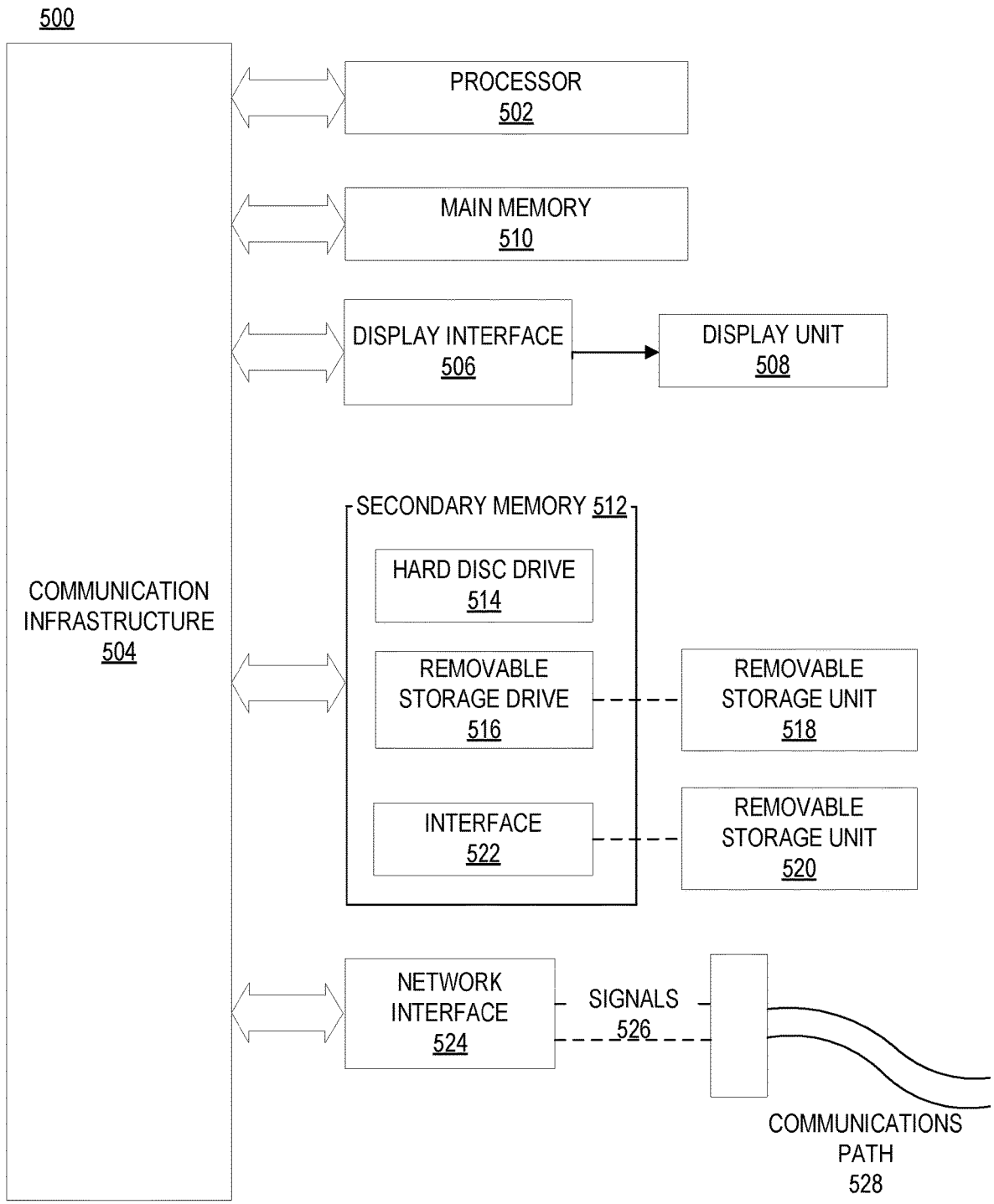
FIG. 5 illustrates a block diagram of an exemplary computer system for implementing the present disclosure, in accordance with various embodiments.

In fact, in accordance with various embodiments of the present disclosure, the present disclosure is directed towards one or more computer systems capable of carrying out the functionality described herein. An example of the computer systems includes a computer system 500, which is shown in FIG. 5.

The computer system 500 includes at least one processor, such as a processor 502. Processor 502 is connected to a communication infrastructure 504, for example, a communications bus, a cross over bar, a network, and the like. Various software embodiments are described in terms of this exemplary computer system 500. After reading this description, it will become apparent to a person skilled in the relevant art(s) how to implement the present disclosure using other computer systems and/or architectures.

The computer system 500 includes a display interface 506 that forwards graphics, text, and other data from the communication infrastructure 504 (or from a frame buffer which is not shown in FIG. 5) for display on a display unit 508.

The computer system 500 further includes a main memory 510, such as random access memory (RAM), and may also include a secondary memory 512. The secondary memory 512 may further include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a well-known manner. The removable storage unit 518 may represent a floppy disk, magnetic tape or an optical disk, and may be read by and written on by the removable storage drive 516. As will be appreciated, the removable storage unit 518 includes a computer usable storage medium having stored therein, computer software and/or data.

In various embodiments, the secondary memory 512 may include other similar devices for allowing computer programs or other instructions to be loaded into the computer system 500. Such devices may include, for example, a removable storage unit 520, and an interface 522. Examples of such devices may include a program cartridge and cartridge interface (such as that found in video game devices), a removable memory chip (such as an erasable programmable read only memory (EPROM), or programmable read only memory (PROM)) and associated socket, and other removable storage units 520 and interfaces 522, which allow software and data to be transferred from the removable storage unit 520 to the computer system 500.

The computer system 500 may further include a communication interface 524. The communication interface 524 allows software and data to be transferred between the computer system 500 and external devices. Examples of the communication interface 524 include, but may not be limited to a modem, a network interface (such as an Ethernet card), a communications port, a Personal Computer Memory Card International Association (PCMCIA) slot and card, and the like. Software and data transferred via the communication interface 524 are in the form of a plurality of signals, hereinafter referred to as signals 526, which may be electronic, electromagnetic, optical or other signals capable of being received by the communication interface 524. The signals 526 are provided to the communication interface 524 via a communication path (e.g., channel) 528. The communication path 528 carries the signals 526 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 516, a hard disk installed in hard disk drive 514, the signals 526, and the like. These computer program products provide software to the computer system 500. The present disclosure is directed to such computer program products.

Computer programs (also referred to as computer control logic) are stored in the main memory 510 and/or the secondary memory 512. Computer programs may also be received via the communication interface 504. Such computer programs, when executed, enable the computer system 800 to perform the features of the present disclosure, as discussed herein. In particular, the computer programs, when executed, enable the processor 502 to perform the features of the present disclosure. Accordingly, such computer programs represent controllers of the computer system 500.

In accordance with various embodiments, where the present disclosure is implemented using a software, the software may be stored in a computer program product and loaded into the computer system 500 using the removable storage drive 516, the hard disk drive 514 or the communication interface 524. The control logic (software), when executed by the processor 502, causes the processor 502 to perform the functions of the present disclosure as described herein.

In various embodiments, the present disclosure is implemented primarily in hardware using, for example, hardware components such as application specific integrated circuits (ASIC). Implementation of the hardware state machine so as to perform the functions described herein will be apparent to persons skilled in the relevant art(s). In various embodiments, the present disclosure is implemented using a combination of both the hardware and the software.

The various embodiments have been described above, it should be understood that they have been presented by way of example, and not limitation. It will be apparent to persons skilled in the relevant art(s) that various changes in form and detail can be made therein without departing from the spirit and scope of the present disclosure. Thus, the present disclosure should not be limited by any of the above described exemplary embodiments, but should be defined only in accordance with the following claims and their equivalents.

In addition, it should be understood that the figures illustrated in the attachments, which highlight the functionality and advantages of the present disclosure, are presented for example purposes only. The architecture of the present disclosure is sufficiently flexible and configurable, such that it may be utilized (and navigated) in ways other than that shown in the accompanying figures.

The detailed description of exemplary embodiments of the present disclosure herein makes reference to the accompanying drawings and figures, which show the exemplary embodiments by way of illustration only. While these exemplary embodiments are described in sufficient detail to enable those skilled in the art to practice the present disclosure, it should be understood that other embodiments may be realized and that logical and mechanical changes may be made without departing from the spirit and scope of the present disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented.

The present disclosure is described herein with reference to system architecture, block diagrams and flowchart illustrations of methods, and computer program products according to various aspects of the present disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Elements disclosed herein may be implemented on a processor, such as a processor for leveraging social media messaging. A tangible, non-transitory memory may be configured to communicate with the processor. The tangible, non-transitory memory may have instructions stored thereon that, in response to execution by the processor, cause the processor to perform operations. Also an article of manufacture including a non-transitory, tangible computer readable storage medium may have instructions stored thereon that, in response to execution by a computer-based system, such as a computer-based system for leveraging social media messaging, cause the computer-based system to perform operations performing functions described herein.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

What is claimed is:

1. A method comprising:

receiving, by a computer-based system and from a merchant device of a merchant via a publicly available broadcast social media messaging channel that is hosted and implemented on a social media server, an enrollment request message in a first format, wherein the first format includes a first set of characters representing a header indicating an enrollment request, a second set of characters representing a merchant identifier for the merchant, a third set of characters representing a merchant transaction account code, and a fourth set of characters representing a merchant device identifier;

approving, by the computer-based system, the enrollment request message;

monitoring, by the computer-based system, the publicly available broadcast social media messaging channel for a service request message from the merchant on the merchant device that is enrolled and that includes a host address;

receiving, by the computer-based system and from a first user that corresponds to the merchant device via the publicly available broadcast social media messaging channel, the service request message in a second format, wherein the second format starts with a fifth set of characters representing a request header indicating a service request, followed by a sixth set of characters representing a date range for transaction details, and a seventh set of characters representing the merchant identifier for the merchant, wherein the service request message includes a request from the first user for merchant transaction data relating to at least one of payment information exchanged between the merchant and a customer, merchant dispute status, merchant reconciliation information, updates to the payment information, merchant chargeback or merchant net account balance;

receiving, by the computer-based system and from the merchant device, current geo-location information for the merchant device and a hierarchy position identifier of the first user of the merchant device;

determining, by the computer-based system, whether the current geo-location information complies with stored geo-location information;

in response to determining that the current geo-location information does not comply with the stored geo-location information:

transmitting, by the computer-based system and to the first user, a request for additional verification information, in response to the current geo-location information not complying with the stored geo-location information; and verifying, by the computer-based system, the additional verification information;

identifying, by the computer-based system, a merchant transaction account in order to access merchant transaction data, the merchant transaction account being identified based on the first user, the merchant identifier, the hierarchy position identifier of the first user, and device type information associated with the merchant device, wherein the merchant transaction account is identified further based on at least one of: the verified additional verification information or the current geo-location information complying with the stored geo-location information, wherein the merchant transaction account is accessible by a plurality of users based on access levels associated with the hierarchy position identifier;

accessing, by the computer-based system, the merchant transaction data associated with the merchant transaction account linked to the first user and the merchant identifier;

filtering, by the computer-based system, the merchant transaction data to create a filtered dataset based on the current geo-location information of the merchant device; and transmitting, by the computer-based system and to the first user of the merchant device, a reply on the publicly available broadcast social media messaging channel, wherein the reply includes the filtered dataset.

2. The method of claim 1, further comprising enrolling, by the computer-based system and in response to approving the enrollment request message, the merchant.

3. The method of claim 1, wherein the second format further includes an eighth set of characters representing at least a portion of the merchant transaction account code.

4. The method of claim 2, wherein the enrolling includes processing hierarchy information, and services that are accessible to the first user based on the hierarchy position identifier from the hierarchy information.

5. The method of claim 1, wherein the reply provides information relating to at least one of the payment information exchanged between the merchant and the customer, the merchant dispute status, the merchant reconciliation information, the updates to the payment information, the merchant chargeback or the merchant net account balance.

6. The method of claim 1, further comprising transmitting, by the computer-based system, a second reply to the service request message on a second publicly available broadcast social media messaging channel in response to receiving an error message associated with the reply on the publicly available broadcast social media messaging channel.

7. The method of claim 1, further comprising transmitting, by the computer-based system, a second reply to the service request message on a non-publicly available broadcast social media messaging channel in response to receiving an error message associated with the reply on the publicly available broadcast social media messaging channel.

8. The method of claim 1, wherein the publicly available broadcast social media messaging channel comprises at least one of text message, instant message, computer-supported collaboration work, servicing request message, MIME email message, multimedia messaging service message, or short messaging service message.

9. The method of claim 1, wherein the approving further comprises determining that the merchant identifier is in a hierarchy of merchant identifiers for merchants affiliated with the merchant to provide access to the merchant transaction account.

10. The method of claim 1, wherein the computer-based system is administered by a transaction processor.

11. The method of claim 1, further comprising sorting, by the computer-based system, the merchant transaction data based on the current geo-location information of the merchant device transmitting the service request message.

12. The method of claim 1, further comprising determining the current geo-location information based on at least one of Global Positioning Satellite (GPS) geometrical co-ordinates of the merchant device, global packet radio service (GPRS) of the merchant device, or Internet Protocol address of the merchant device.

13. A system comprising:
a processor; and
a tangible, non-transitory memory configured to communicate with the processor, the tangible, non-transitory memory having instructions stored thereon that, in response to execution by the processor, cause the processor to perform operations comprising:

receiving, by the processor and from a merchant device of a merchant via a publicly available broadcast social media messaging channel that is hosted and implemented on a social media server, an enrollment request message in a first format, wherein the first format includes a first set of characters representing a header indicating an enrollment request, a second set of characters representing a merchant identifier for the merchant, a third set of characters representing a merchant transaction account code, and a fourth set of characters representing a merchant device identifier;

approving, by the processor, the enrollment request message;

monitoring, by the processor, the publicly available broadcast social media messaging channel for a service request message from the merchant on the merchant device that is enrolled and that includes a host address;

receiving, by the processor and from a first user that corresponds to the merchant device via the publicly available broadcast social media messaging channel, the service request message in a second format, wherein the second format starts with a fifth set of characters representing a request header indicating a service request, followed by a sixth set of characters representing a date range for transaction details, and a seventh set of characters representing the merchant identifier for the merchant, wherein the service request message includes a request from the first user for merchant transaction data relating to at least one of payment information exchanged between the merchant and a customer, merchant dispute status, merchant reconciliation information, updates to the payment information, merchant chargeback or merchant net account balance;

receiving, by the processor and from the merchant device, current geo-location information for the merchant device and a hierarchy position identifier of the first user of the merchant device;

determining, by the processor, whether the current geo-location information complies with stored geo-location information;

in response to determining that the current geo-location information does not comply with the stored geo-location information:

transmitting, by the processor and to the first user, a request for additional verification information, in response to the current geo-location information not complying with the stored geo-location information; and verifying, by the processor, the additional verification information;

identifying, by the processor, a merchant transaction account in order to access merchant transaction data, the merchant transaction account being identified based on the first user, the merchant identifier, the hierarchy position identifier of the first user, and device type information associated with the merchant device, wherein the merchant transaction account is identified further based on at least one of: the verified additional verification information or the current geo-location information complying with the stored geo-location information, wherein the merchant transaction account is accessible by a plurality of users based on access levels associated with the hierarchy position identifier;

accessing, by the processor, the merchant transaction data associated with the merchant transaction account linked to the first user and the merchant identifier;

filtering, by the processor, the merchant transaction data to create a filtered dataset based on the current geo-location information of the merchant device; and transmitting, by the processor and to the first user of the merchant device, a reply on the publicly available broadcast social media messaging channel, wherein the reply includes the filtered dataset.

14. An article of manufacture including a non-transitory, tangible computer readable storage medium having instructions stored thereon that, in response to execution by a computer-based system, cause the computer-based system to perform operations comprising:

receiving, by the computer-based system and from a merchant device of a merchant via a publicly available broadcast social media messaging channel that is hosted and implemented on a social media server, an enrollment request message in a first format, wherein the first format includes a first set of characters representing a header indicating an enrollment request, a second set of characters representing a merchant identifier for the merchant, a third set of characters representing a merchant transaction account code, and a fourth set of characters representing a merchant device identifier;

approving, by the computer-based system, the enrollment request message;

monitoring, by the computer-based system, the publicly available broadcast social media messaging channel for a service request message from the merchant on the merchant device that is enrolled and that includes a host address;

receiving, by the computer-based system and from a first user that corresponds to the merchant device via the publicly available broadcast social media messaging channel, the service request message in a second format, wherein the second format starts with a fifth set of characters representing a request header indicating a service request, followed by a sixth set of characters representing a date range for transaction details, and a seventh set of characters representing the merchant identifier for the merchant, wherein the service request message includes a request from the first user for merchant transaction data relating to at least one of payment information exchanged between the merchant and a customer, merchant dispute status, merchant reconciliation information, updates to the payment information, merchant chargeback or merchant net account balance;

receiving, by the computer-based system and from the merchant device, current eo-location information for the merchant device and a hierarchy position identifier of the first user of the merchant device;

determining, by the computer-based system, whether the current geo-location information complies with stored geo-location information;

in response to determining that the current geo-location information does not comply with the stored geo-location information:

transmitting, by the computer-based system and to the first user, a request for additional verification information, in response to the current geo-location information not complying with the stored geo-location information; and verifying, by the computer-based system, the additional verification information;

identifying, by the computer-based system, a merchant transaction account in order to access merchant transaction data, the merchant transaction account being identified based on the first user, the merchant identifier, the hierarchy position identifier of the first user, and device type information associated with the merchant device, wherein the merchant transaction account is identified further based on at least one of: the verified additional verification information or the current geo-location information complying with the stored geo-location information, wherein the merchant transaction account is accessible by a plurality of users based on access levels associated with the hierarchy position identifier;

accessing, by the computer-based system, the merchant transaction data associated with the merchant transaction account linked to the first user and the merchant identifier;

filtering, by the computer-based system, the merchant transaction data to create a filtered dataset based on the current geo-location information of the merchant device; and transmitting, by the computer-based system and to the first user of the merchant device, a reply on the publicly available broadcast social media messaging channel, wherein the reply includes the filtered dataset.

15. The method of claim 1, wherein the reply provides information relating to at least one of the payment information exchanged between the merchant and the customer, the merchant dispute status, the merchant reconciliation information, the updates to the payment information, the merchant chargeback or the merchant net account balance.

16. The method of claim 1, wherein the current geo-location information is received in response to receiving the service request message, and the method further comprises:

receiving, by the computer-based system and from the merchant device, second geo-location information for the merchant device in response to receiving the enrollment request message;

verifying, by the computer-based system, the enrollment request message and the second geo-location information for the merchant device based on determining that the second geo-location information complies with the stored geo-location information; and wherein the enrollment request message is approved in response to verifying the enrollment request message and the second geo-location information for the merchant device.

17. The method of claim 1, wherein the service request message further comprises an eighth set of characters representing the merchant transaction account code.

18. The method of claim 1, wherein the merchant identifier is automatically inputted into the service request message.

19. The system of claim 13, wherein the publicly available broadcast social media messaging channel comprises at least one of text message, instant message, computer-supported collaboration work, servicing request message, MIME email message, multimedia messaging service message, or short messaging service message.

* * * * *